(12) United States Patent
Asati et al.

(10) Patent No.: US 12,219,037 B2
(45) Date of Patent: Feb. 4, 2025

(54) HARDWARE-ACCELERATED SERVICE MESH

(71) Applicant: Cisco Technology, Inc., San Jose, CA (US)

(72) Inventors: Rajiv Asati, Morrisville, NC (US); Edward Albert Warnicke, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/298,789

(22) Filed: Apr. 11, 2023

(65) Prior Publication Data

US 2024/0348708 A1    Oct. 17, 2024

(51) Int. Cl.
  *G06F 15/16* (2006.01)
  *H04L 67/02* (2022.01)
  *H04L 69/22* (2022.01)

(52) U.S. Cl.
  CPC .............. *H04L 69/22* (2013.01); *H04L 67/02* (2013.01)

(58) Field of Classification Search
  CPC .............................. H04L 69/22; H04L 67/02
  See application file for complete search history.

(56) References Cited

U.S. PATENT DOCUMENTS

| | | | |
|---|---|---|---|
| 2016/0150055 A1* | 5/2016 | Choi ................. | H04L 69/22 370/401 |
| 2021/0117242 A1 | 4/2021 | Van De Groenendaal et al. | |
| 2021/0243247 A1 | 8/2021 | He et al. | |
| 2022/0014459 A1 | 1/2022 | Ganguli et al. | |
| 2022/0109693 A1 | 4/2022 | Mashargah et al. | |
| 2022/0217085 A1 | 7/2022 | Sankar et al. | |
| 2022/0263913 A1* | 8/2022 | Zhang ................. | G06F 3/0604 |
| 2022/0311681 A1 | 9/2022 | Palladino et al. | |
| 2023/0074934 A1* | 3/2023 | Li ..................... | H04W 12/10 |

OTHER PUBLICATIONS

European Search Report for European Application No. 24168566.8, dated Aug. 13, 2024, 11 Pages.

* cited by examiner

*Primary Examiner* — Padma Mundur
(74) *Attorney, Agent, or Firm* — Lee & Hayes, P.C.

(57) ABSTRACT

A method of managing data streaming processes may include at a processing device, computing hypertext transmission protocol version 3 (HTTP/3) header of a first message received at a first network interface controller (NIC) into a first control message and a second control message, and transmitting the first control message to the first NIC associated with the processing device. The method may further include transmitting the second control message to a second NIC associated with the processing device, and with the first control message and the second control message, transmitting data directly between the first NIC and the second NIC.

18 Claims, 9 Drawing Sheets

HARDWARE-ACCELERATED SERVICE MESH

TECHNICAL FIELD

The present disclosure relates generally to computing. Specifically, the present disclosure relates to systems and methods for accelerating service mesh networks.

BACKGROUND

A service mesh is a software architecture that includes a dedicated infrastructure layer for facilitating and controlling service-to-service communications between services or microservices over a network and using a proxy. This method enables separate parts of an application to communicate with each other. Service meshes appear commonly in concert with cloud-based applications, containers and microservices. As mentioned, a service mesh may include network proxies paired with each service in an application and a set of task management processes. The proxies may be referred to as the data plane and the management processes may be referred to as the control plane. The data plane intercepts calls between different services and processes the calls. The control plane acts as the brain of the service mesh that coordinates the behavior of proxies and provides APIs for operations and maintenance personnel to manipulate and observe the entire network. A service mesh architecture may be implemented by software products like Istio®, Linkerd®, Consul®, AWS® App Mesh®, Kuma®, Tracfik Mesh®, and Open Service Mesh.

Service mesh is an emerging and increasingly popular software architecture in cloud-native computing. Cloud-native computing, in software development, utilizes cloud computing to build and run scalable applications in modern, dynamic environments such as public, private, and hybrid clouds and includes technologies such as containers, microservices, serverless functions, cloud native processors and immutable infrastructure. These technologies may be deployed via declarative code and may focus on minimizing a users' operational burden. A service mesh may operate at layer 7 (L7) or application layer of the Open Systems Interconnection model (OSI model) and may utilize, for example, hypertext transfer protocol (HTTP) as an application layer protocol. The service mesh may, therefore, make decisions based on uniform resource locators (URLs), HTTP header, and user identities rather than internet protocol (IP) addresses and port identifiers. Any high level intent may be stored centrally, and the resulting required behaviors may be pushed down to L7 proxies as close to the edge devices within the network as possible. By moving the L7 proxies as close to the edge devices as possible, the handling of traffic may be uplifted to L7 as soon as possible. Traffic may be encapsulated using transport layer security (TLS) cryptographic protocols when sent out from the L7 proxies.

With the above background, service mesh may have several limits or weaknesses in spite of the benefits service mesh provides. For example, L7 software proxies are relatively very slow when compared to packet processing methods. Further, passing through a number of L7 proxies and gateways may add large amounts of latency to communications. These performance and latency issues cause degradation within a mesh network because a service mesh includes an overhead of a transmission control protocol/internet protocol (TCP/IP) network stack. For example, a communication within a service mesh may traverse the TCP/IP stack three times per pod within the data plane. This is in addition to the ping-pong between user space at the proxy and the kernel space where a firewall (e.g., Netfilter) may be implemented and where traffic is routed to and from the proxy. Further, this may all be independent of any pod-to-pod communication being on the same or different hosts including, for example, any request sent by the application container (e.g., inbound and outbound), and any deployment of a companion container to the application container (e.g., Envoy client sidecar to Envoy server sidecar). These issues prevent application developers who may have relatively higher performance and latency needs from taking advantage of the benefits of a service mesh.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
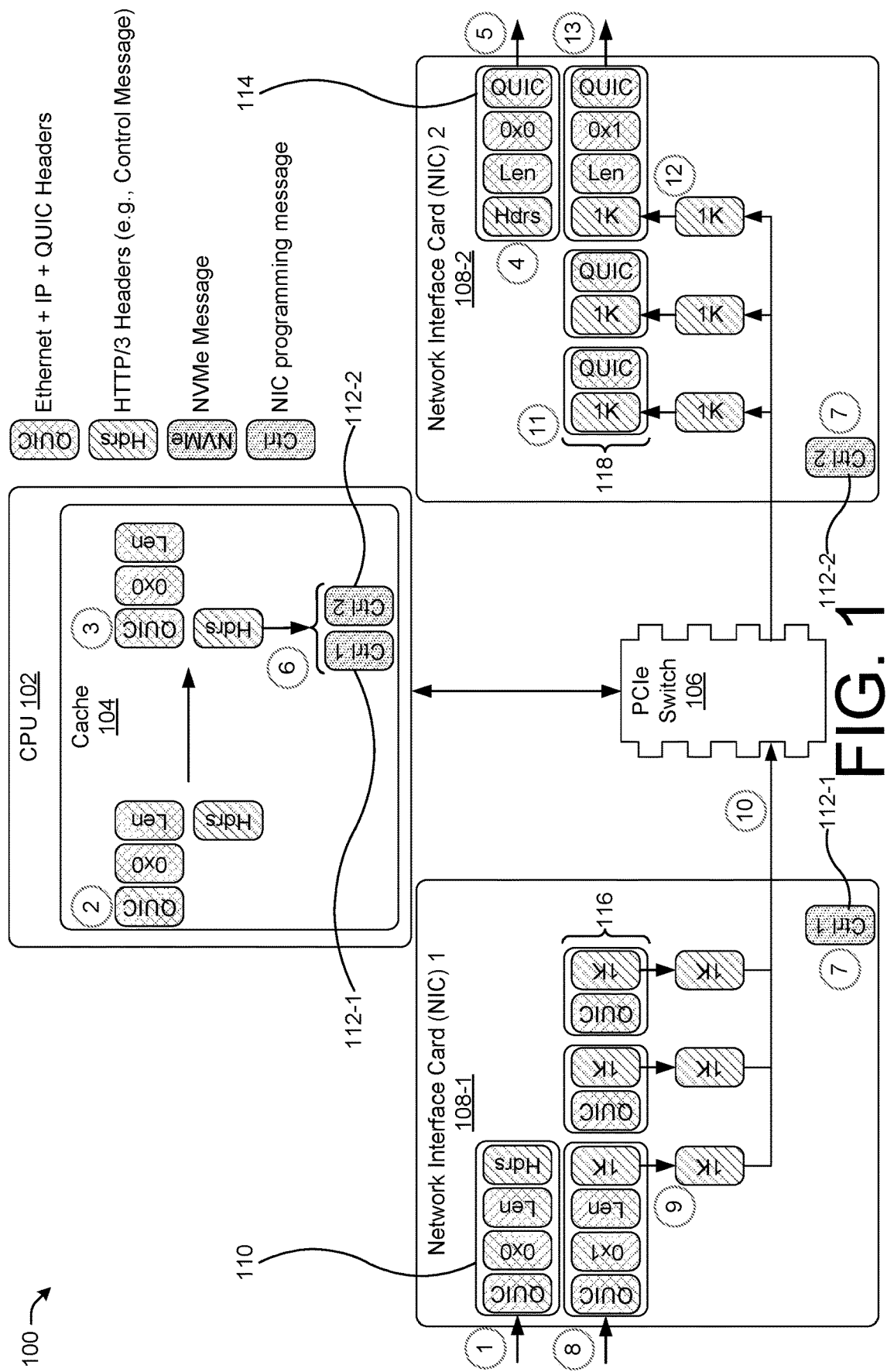
FIG. 1 illustrates a system-architecture diagram of a computing system that utilizes a hardware accelerated service mesh request, according to an example of the principles described herein.

As described above, service meshes may have several limits or weaknesses in spite of the benefits service mesh provides including performance and latency. These issues prevent application developers who may have relatively higher performance and latency needs from taking advantage of the benefits of a service mesh. The present systems and methods apply control plane and data plane separation to the issues that may be presented pertaining to L7 HTTP messages in a service mesh. Service meshes provide many advantages to users. However, complaints mount in this technological field about the performance of service meshes across multiple dimensions. The present systems and methods provide viable means to accelerate service meshes with hardware that is applicable to both on premises and hyperscalar users.

Overview

The examples described herein allow for the splitting of the control plane and the data plane to ensure that the data may skip having to move through the CPU cache during stream processing. This has significant advantages within the proxying of L7 HTTP messages. Structurally, in service mesh-based cloud applications, HTTP headers are control information which are passed by proxies. The proxies make complex decisions about the next hop of the HTTP messages and what, if any, operations may or should be performed on the HTTP headers. The service mesh proxies do not eliminate HTTP, TCP, or UDP headers from packets before routing payload packets. The present systems and methods preserve the ability to remove the headers from the packets. Thus, the present systems and method leave decision making processes such as HTTP routing, etc. with the CPU where arbitrarily complex code may be used to make those decisions. However, once the decisions are made, the present systems and methods offload the data plane to a first and second network interface controller (NIC). The first and second NIC may handle the encapsulation and de-encapsulation, as well as the forwarding the relevant payloads directly between the first and second NIC over a PCIe switch without passing the data payload through a cache of the CPU.

Examples described herein provide a non-transitory computer-readable medium storing instructions that, when executed, causes a processor to perform operations. The operations may include, at a processing device, computing a hypertext transmission protocol version 3 (HTTP/3) header of a first message received at a first network interface controller (NIC) into a first control message and a second control message, and transmitting the first control message to the first NIC associated with the processing device. The operations may further include transmitting the second control message to a second NIC associated with the processing device, and, with the first control message and the second control message, transmitting data directly between the first NIC and the second NIC.

The first control message defines a destination computing device to which a payload is to be sent, and the second control message defines instructions to the destination computing device to expect the payload. The operations may further include copying the HTTP/3 header of the first message to a cache associated with the processing device, generating a response header based on the HTTP/3 header, and transmitting the response header to the second NIC. The operations may further include including the response header in a first data packet based on the second control message and transmitting the first data packet to a destination device based on the second control message.

The operations may further include, with the first NIC, extracting first data from a first data packet received at the first NIC based on the first control message, and transmitting the first data to the second NIC based on the first control message. The operations may further include, with the second NIC, generating a second data packet, encapsulating the first data in the second data packet based on the second control message, and transmitting the second data packet from the second NIC to a destination computing device.

The operations may further include, with the second NIC, extracting second data from a third data packet received at the second NIC based on the second control message, and transmitting the second data to the first NIC based on the second control message. The operations may further include, with the first NIC, generating a fourth data packet, encapsulating the second data in the fourth data packet based on the first control message, and transmitting the fourth data packet from the first NIC to a source computing device.

Examples described herein also provide a method of managing data streaming processes may include at a processing device, computing hypertext transmission protocol version 3 (HTTP/3) header of a first message received at a first network interface controller (NIC) into a first control message and a second control message, and transmitting the first control message to the first NIC associated with the processing device. The method may further include transmitting the second control message to a second NIC associated with the processing device, and with the first control message and the second control message, transmitting data directly between the first NIC and the second NIC.

The first control message defines a destination computing device to which a payload is to be sent, and the second control message defines instructions to the destination computing device to expect the payload. The method may further include copying the HTTP/3 header of the first message to a cache associated with the processing device, generating a response header based on the HTTP/3 header, and transmitting the response header to the second NIC. The method may further include including the response header in a first data packet based on the second control message and transmitting the first data packet to a destination device based on the second control message.

The method may further include, with the first NIC, extracting first data from a first data packet received at the first NIC based on the first control message, and transmitting the first data to the second NIC based on the first control message. The method may further include, with the second NIC, generating a second data packet, encapsulating the first data in the second data packet based on the second control message, and transmitting the second data packet from the second NIC to a destination computing device.

The method may further include, with the second NIC, extracting second data from a third data packet received at the second NIC based on the second control message, and transmitting the second data to the first NIC based on the second control message. The method may further include, with the first NIC, generating a fourth data packet, encapsulating the second data in the fourth data packet based on the first control message, and transmitting the fourth data packet from the first NIC to a source computing device.

Examples described herein also provide a system including a processor, and a non-transitory computer-readable media storing instructions that, when executed by the processor, causes the processor to perform operations. The operations may include at the processor, computing a hypertext transmission protocol version 3 (HTTP/3) header of a first message received at a first network interface controller (NIC) into a first control message and a second control message. The operations may further include transmitting the first control message to the first NIC associated with the processor, transmitting the second control message to a second NIC associated with the processor, and with the first control message and the second control message, transmitting data directly between the first NIC and the second NIC.

The operations may further include copying the HTTP/3 header of the first message to a cache associated with the processor and generating a response header based on the HTTP/3 header. The operations may further include transmitting the response header to the second NIC, including the response header in a first data packet based on the second control message, and transmitting the first data packet to a destination device based on the second control message.

The operations may further include, with the first NIC, extracting first data from a first data packet received at the first NIC based on the first control message, and transmitting the first data to the second NIC based on the first control message. The operations may further include, with the second NIC, generating a second data packet, encapsulating the first data in the second data packet based on the second control message, and transmitting the second data packet from the second NIC to a destination computing device.

The operations may further include, with the second NIC, extracting second data from a third data packet received at the second NIC based on the second control message, and transmitting the second data to the first NIC based on the second control message. The operations may further include, with the first NIC, generating a fourth data packet, encapsulating the second data in the fourth data packet based on the first control message, and transmitting the fourth data packet from the first NIC to a source computing device.

Additionally, the techniques described in this disclosure may be performed as a method and/or by a system having non-transitory computer-readable media storing computer-executable instructions that, when executed by one or more processors, performs the techniques described above.

Example Embodiments

Turning now to the figures, FIG. 1 illustrates a system-architecture diagram of a computing system 100 that utilizes a hardware accelerated service mesh request, according to an example of the principles described herein. The computing system 100 may include a processing device such as the CPU 102. As illustrated, the computing system 100 may include one or more hardware processor(s) such as the CPU 102 configured to execute one or more stored instructions. The CPU 102 may include one or more data processing cores. Further, a cache 104 may be associated with the CPU 102. The cache 104 may include any hardware or software component that stores data so that future requests for that data may be served faster and the data stored in the cache may be the result of an earlier computation or a copy of data stored elsewhere.

The CPU 102 may be communicatively coupled to a bus including any communication system that transfers data between components within the computing system 100 or between the computing system 100 and other computing devices (not shown). The bus may include any related hardware components (e.g., wire, optical fiber, etc.) and software, including communication protocols that function to transmit data. In the example of FIG. 1, the bus may include a PCIe switch 106. However, any bus that utilizes any communication protocols may be used.

The CPU 102 and the PCIe switch 106 may be coupled to a first network interface controller (NIC) 108-1 and a second NIC 108-2 via the PCIe switch 106. The first NIC 108-1 and the second NIC 108-2 may include any computer hardware component that connects the computing system 100 to a computer network and other computing devices within the computer network. The first NIC 108-1 and the second NIC 108-2 may include electronic circuitry to communicate using any physical layer and data link layer standards to provide a base for a full network protocol stack, allowing communication among computers on the same local area network (LAN) and large-scale network communications through routable protocols, such as Internet Protocol (IP). The first NIC 108-1 and the second NIC 108-2 may also include hardware and software that allows computing devices to communicate over a computer network through wired or wireless communications. In one example, the first NIC 108-1 and the second NIC 108-2 may include both a physical layer and data link layer device to provide physical access to a networking medium and, for Institute of Electrical and Electronics Engineers (IEEE) 802 standards-based networks and similar networks and provides a low-level addressing system through the use of MAC addresses that are uniquely assigned to network interfaces. In the examples described herein, the first NIC 108-1 and the second NIC 108-2 may communicate with a number of computing devices (not shown) communicatively coupled to the computing system 100.

The computing system 100 may include other computing elements and devices not shown. However, having described the CPU 102, cache 104, the PCIe switch 106, the first NIC 108-1, and the second NIC 108-2, we will now describe the process by which these devices within the computing system 100 separate the control plane from the data plane and provides for the direct transfer of data between the first NIC 108-1 and the second NIC 108-2 (e.g., request and response operations) via the PCIe switch 106 without caching the data within the cache 104. This methods associated with request and response operations are indicated by numbered elements in FIGS. 1 and 2. As indicated above, FIG. 1 illustrates a system-architecture diagram of a computing system 100 that utilizes a hardware accelerated service mesh request, according to an example of the principles described herein. The request and response operations described in FIGS. 1 and 2 may be described in the context of streaming data between a source computing device (not shown) communicatively coupled to the first NIC 108-1 and a requesting computing device (not shown) communicatively coupled to the second NIC 108-2. However, the request and response operations described in FIGS. 1 and 2 may apply to any type of data communications and purposes.

The direct request operation of FIG. 1 may include receiving, at 1, a direct request message 110 from a source computing device (not shown) communicatively coupled to the computing system 100 via the first NIC 108-1. The read request may include an HTTP/3 stream command. The direct request message 110 may include a general-purpose transport layer network protocol header such as a QUIC header as depicted in FIG. 1. HTTP/3 provides a transport for HTTP semantics using the QUIC transport protocol and an internal framing layer, and, therefore, the QUIC headers are utilized. Once a networked device knows that an HTTP/3 server exists at a certain endpoint, it may open a QUIC connection. QUIC provides protocol negotiation, stream-based multiplexing, and flow control. Within each stream, the basic unit of HTTP/3 communication may include a frame. Each frame type may serve a different purpose. For example, headers frames and data frames form the basis of HTTP/3 requests and responses. Frames that apply to the entire connection are conveyed on a dedicated control stream.

Thus, the direct request message 110 may further include a data frame (e.g., type 0x0 as depicted in FIG. 1). The data frames convey arbitrary, variable-length sequences of bytes associated with an HTTP/3 request or response payload. A length frame that includes a variable-length integer (e.g., "Len" as depicted in FIG. 1) and that describes the length of the frame payload may also be included in the direct request message 110. This length does not include the type field as does the data frame. The direct request message 110 may also include a number of HTTP/3 headers (e.g., "Hdrs" as depicted in FIG. 1).

At 2 of FIG. 1, the first NIC 108-1 sends the direct request message 110 to the cache 104 of the CPU 102. At 2, the header segments (e.g., QUIC header, data frame, length frame, and HTTP/3 headers) may be separated in the cache 104. The headers of the direct request message 110 may be copied within the cache 104 at 3 in order to prepare response headers for a response package 114 for the direct request message 110. In one example, the response controlled and defined by the CPU 102 may include a response defining that the requesting computing device (not shown) communicatively coupled to the second NIC 108-2 is not allowed receive data from the source computing device (not shown) communicatively coupled to the computing system 100 via the first NIC 108-1. In one example, the response controlled and defined by the CPU 102 may include a response defining that the requesting computing device (not shown) communicatively coupled to the second NIC 108-2 is allowed receive data from the source computing device (not shown) communicatively coupled to the computing system 100 via the first NIC 108-1. In this manner, the CPU 102 may maintain control with regard to what data may be streamed between the source computing device (not shown) communicatively coupled to the computing system 100 via the first NIC 108-1 and the requesting computing device (not shown) communicatively coupled to the second NIC 108-2.

Assuming the CPU 102 allows for the requesting computing device (not shown) communicatively coupled to the second NIC 108-2 to receive data from the source computing device (not shown) communicatively coupled to the computing system 100 via the first NIC 108-1, the response headers created at 3 may be copied to or sent to the second NIC 108-2 at 4 and placed in the response packet 114. At 5, the response packet 114 may be sent to the requesting computing device (not shown) communicatively coupled to the second NIC 108-2. The response packet 114 may inform the requesting computing device (not shown) to expect a QUIC/HTTP data packet transmission message to the original direct request message 110 received at 1.

At 6, the CPU 102 may translate the headers of the direct request message 110 sent to the cache 104 of the CPU 102 by the first NIC 108-1 at 2 and copied at 3 into a first control message 112-1 and a second control message 112-2 as indicated in FIG. 1. The first control message 112-1 and a second control message 112-2 may be produced by the CPU 102 and may include instructions to the first NIC 108-1 and the second NIC 108-2 to send data in subsequently-received QUIC/HTTPs packet(s) (e.g., payload message 116) to a destination including the source computing device (not shown) communicatively coupled to the computing system 100 via the first NIC 108-1 and the requesting computing device (not shown) communicatively coupled to the second NIC 108-2.

When the CPU 102 translates the headers of the direct request message 110 into the first control message 112-1 and a second control message 112-2, the CPU 102 may include instructions within the first control message 112-1 and a second control message 112-2 as to which data may be transmitted between the source computing device (not shown) communicatively coupled to the first NIC 108-1 and the requesting computing device (not shown) communicatively coupled to the second NIC 108-2, whether the source computing device (not shown) and the requesting computing device (not shown) are allowed to communicate with one another, a frequency of such communications, an amount of data that may be transmitted via such communications, and other instructions or restrictions that may be placed on the streaming of the data.

At 7 of FIG. 1, the first control message 112-1 and a second control message 112-2 may be transmitted to the first NIC 108-1 and the second NIC 108-2, respectively to control the transmission of data into and out of the computing system 100, as well as between the first NIC 108-1 and the second NIC 108-2. In one example, the first control message 112-1 at the first NIC 108-1 may include CPU-defined instructions as to where to send a payload of a subsequent payload message 116. The second control message 112-2 at the second NIC 108-2 may include CPU-defined instructions to a destination device such as the requesting computing device (not shown) to expect the payload received at the first NIC 108-1 as well as transmitting payloads to the requesting computing device (not shown) after receiving the payload from the first NIC 108-1 and, ultimately, the source computing device (not shown).

Thus, at 8, the payload message 116 may be received at the first NIC 108-1 including a data payload or payload packet(s) for transmission to the second NIC 108-2 and ultimately the requesting computing device (not shown). At 9, the first NIC 108-1 may unload or de-encapsulate the payload received at the first NIC 108-1 within the payload message 116 to obtain the data packets from the payload message 116. As mentioned herein, the payload may include a number of data blocks. Further, the first NIC 108-1 may unload or de-encapsulate the payload based on instructions from the first control message 112-1.

At 10, the first control message 112-1 may transmit the de-encapsulated payload including the data packets to the PCIe switch 106 and onto the second NIC 108-2. In this manner, rather than sending the data packets to the cache 104 of the CPU 102, the data packets may be sent directly to second NIC 108-2 via the PCIe switch 106 without moving the data packets through the cache 104 and based on the first control message 112-1 and the second control message 112-2 instructing the first NIC 108-1 and the second NIC 108-2 in order to do so.

The second control message 112-2, at 11, may generate a QUIC/HTTP data packet transmission message 118 at the second NIC 108-2 for transmitting the data packets obtained via the payload message 116 at the first NIC 108-1. The second control message 112-2 may load or encapsulate the data packets into the QUIC/HTTP data packet transmission message 118 at 12. Further, at 13, the second control message 112-2 may instruct the second NIC 108-2 to transmit the QUIC/HTTP data packet transmission message 118 including the data packets to the requesting computing device (not shown) communicatively coupled to the second NIC 108-2. The requesting computing device (not shown) is the destination to which the data packets are to be sent as defined by the direct request message 110, the CPU 102, and the first control message 112-1 and second control message 112-2.

Using the systems and methods described above in connection with FIG. 1, decision making may be left to the CPU 102 and the first control message 112-1 and second control message 112-2 where arbitrarily complex code may be used to make HTTP routing decisions and other data transmission decisions. However, once, the CPU 102 makes such decisions and generates the first control message 112-1 and second control message 112-2 embodying those decisions, the CPU 102 may offload the data plane functions to the first NIC 108-1 and the second NIC 108-2. The first NIC 108-1 and the second NIC 108-2 may then be tasked with handling the encapsulation, decapsulation, and forwarding of data packets and payloads between the first NIC 108-1 and the second NIC 108-2 via the PCIe switch 106 and ultimately between the source computing device (not shown) and the requesting computing device (not shown) without passing the data packets and payloads through the CPU 102 and the cache 104. It may be noted that the systems and methods described herein may be equally applicable to hairpinning within a single NIC 108-1, 108-2.

Figure 2:
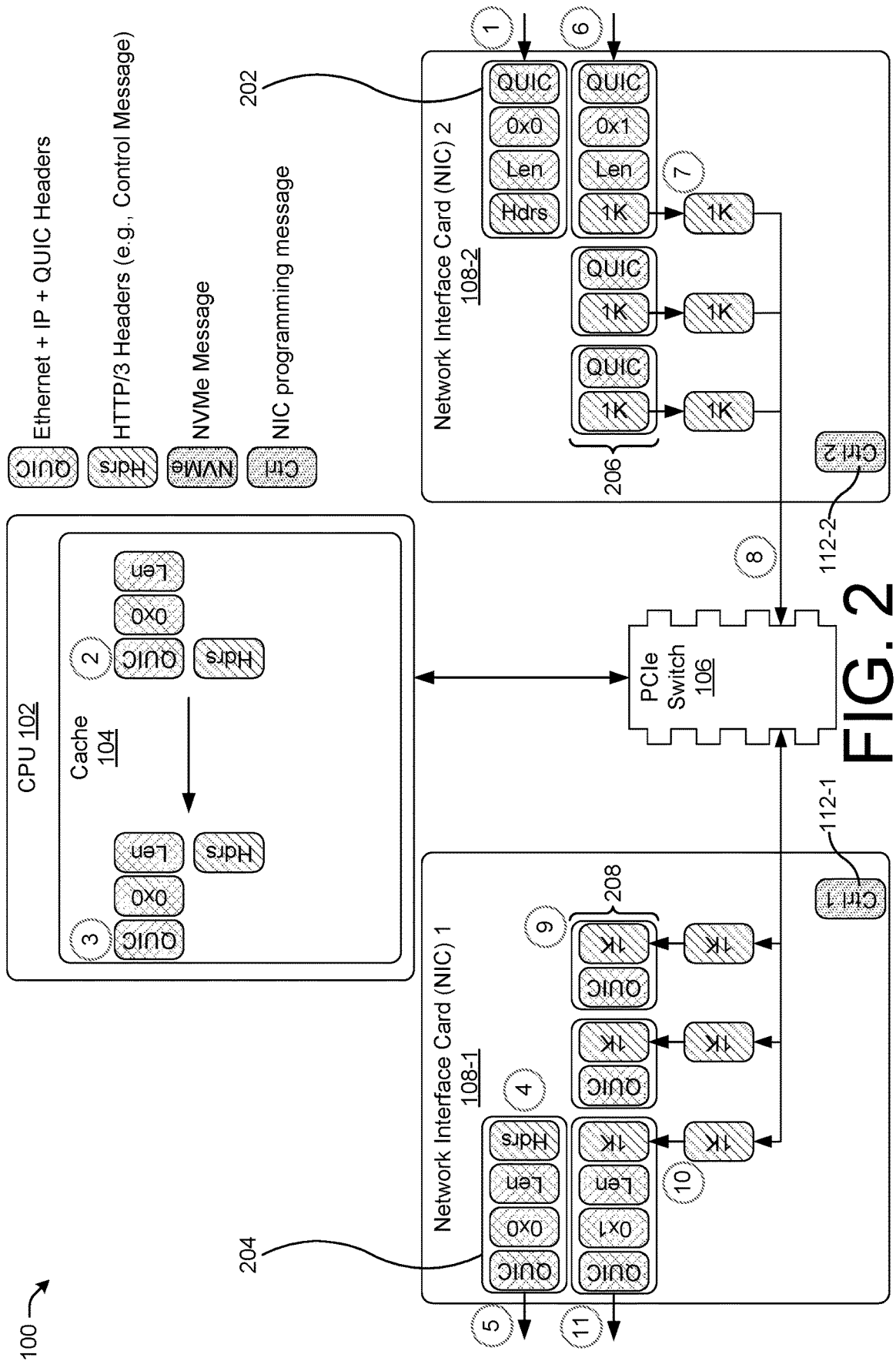
FIG. 2 illustrates a system-architecture diagram of a computing system that utilizes a hardware accelerated service mesh response, according to an example of the principles described herein.

As mentioned herein, the present systems and methods may apply to a hardware accelerated service mesh response as well as the hardware accelerated service mesh request described above in connection with FIG. 1. Thus, FIG. 2 illustrates a system-architecture diagram of a computing system that utilizes a hardware accelerated service mesh response, according to an example of the principles described herein. In the response process described in FIG. 2 and in connection with FIG. 1, the second NIC 108-2 may receive a response message 202. The response message 202 may include an HTTP/3 response stream message and may include QUIC Information. The response message 202 may include a general-purpose transport layer network protocol header such as a QUIC header as depicted in FIG. 2. HTTP/3 provides a transport for HTTP semantics using the QUIC transport protocol and an internal framing layer, and, therefore, the QUIC headers are utilized. Once a networked device knows that an HTTP/3 server exists at a certain endpoint, it may open a QUIC connection. QUIC provides protocol negotiation, stream-based multiplexing, and flow control. Within each stream, the basic unit of HTTP/3 communication may include a frame. Each frame type may serve a different purpose. For example, headers frames and data frames form the basis of HTTP/3 requests and responses. Frames that apply to the entire connection are conveyed on a dedicated control stream.

Thus, the response message 202 may further include a data frame (e.g., type 0x0 as depicted in FIG. 2). The data frames convey arbitrary, variable-length sequences of bytes associated with an HTTP/3 request or response payload. A length frame that includes a variable-length integer (e.g., "Len" as depicted in FIG. 2) and that describes the length of the frame payload may also be included in the response message 202. This length does not include the type field as does the data frame. The response message 202 may also include a number of HTTP/3 headers (e.g., "Hdrs" as depicted in FIG. 2).

At 2 of FIG. 2, the second NIC 108-2 may copy the HTTP/3 headers from the response message 202 to the cache 104. In one example, the CPU 102 and/or the second control message 112-2 may instruct the second NIC 108-2 to copy the HTTP/3 headers from the response message 202 to the cache 104. Also, in one example, the header segments such as the QUIC header, the data frame (e.g., 0x0), the variable-length integer (e.g., Len), and the HTTP/3 headers (e.g., Hdrs) may be split up into individual elements.

At 3, the response headers may be generated in the cache 104. In one example, the response may include instructions from the CPU 102 as to whether streaming between the source computing device (not shown) and the requesting computing device (not shown) is or is not allowed. Assuming that streaming between the source computing device (not shown) and the requesting computing device (not shown) is allowed, the response headers generated at 3 may be copied or transmitted to the first NIC 108-1 and placed in a response packet 204 generated at 4 by the first NIC 108-1 for transmission to the source computing device (not shown) from the first NIC 108-1. Thus, at 5, the first NIC 108-1 may transmit the response packet 204 including the response headers to the source computing device (not shown).

At 6, the second NIC 108-2 may receive a payload message 206. The payload message 206 may include a number of payload packets that include a number of separate 1K data segments for transmission to the source computing device (not shown) via the PCIe switch 106 and the first NIC 108-1. The second NIC 108-2, at 7, may unload or de-encapsulate the payload (e.g., the 1K data blocks) from the payload packets based on the second control message 112-2. It may be noted here that the first control message 112-1 and the second control message 112-2 are retained within the first NIC 108-1 and the second NIC 108-2, respectively, in order to allow for the instructions provided by the CPU 102 to be realized throughout data streaming in both directions between the source computing device (not shown) and the requesting computing device (not shown).

At 8, the second NIC 108-2 may transmit the unloaded or de-encapsulated payload (e.g., the 1K data blocks) to the first NIC 108-1 via the PCIe switch 106. Again, the unloaded or de-encapsulated payload (e.g., the 1K data blocks) are directly transmitted to the first NIC 108-1 without moving through the cache 104 of the CPU 102. Further, the transmission of the unloaded or de-encapsulated payload (e.g., the 1K data blocks) to the first NIC 108-1 at 8 is performed based on the second control message 112-2.

With the unloaded or de-encapsulated payload (e.g., the 1K data blocks) transmitted to the first NIC 108-1, the first NIC 108-1 may, at 9, generate a QUIC/HTTP data packet transmission message 208 based on instructions received from the first control message 112-1 for transmitting the data packets received at the first NIC 108-1. The QUIC/HTTP data packet transmission message 208 may include a number of payload packets to carry the payload (e.g., the 1K data blocks). At 10, the first NIC 108-1 may load or encapsulate the payload (e.g., the 1K data blocks) into the QUIC/HTTP data packet transmission message 208. The first NIC 108-1 may be instructed by the first control message 112-1 to transmit the QUIC/HTTP data packet transmission message 208 to the source computing device (not shown) at 11.

As described above, the systems and methods described herein and in connection with FIGS. 1 and 2 allows for the splitting of the control plane and the data plane to ensure that the data is not cached in the cache 104 of the CPU 102 during a data streaming process. This has significant advantages within the proxying of L7 HTTP messages. Structurally, in service mesh-based cloud applications, HTTP headers are control information which are passed by proxies. The proxies make complex decisions about the next hop of the HTTP messages and what, if any, operations may or should be performed on the HTTP headers. The service mesh proxies do not eliminate HTTP, TCP, or UDP headers from packets before routing those packets. The present systems and methods preserve the ability to remove the headers from the packets. Thus, the present systems and method leave decision making processes such as HTTP routing, etc. with the CPU where arbitrarily complex code may be used to make those decisions. However, once the decisions are made, the present systems and methods offload the data plane to the first NIC 108-1 and the second NIC 108-2. The first NIC 108-1 and the second NIC 108-2 may handle the encapsulation and de-encapsulation, as well as the forwarding the relevant payloads directly between the first NIC 108-1 and the second NIC 108-2 over the PCIe switch 106 without passing the data payload through the cache 104 of the CPU 102.

Figure 3:
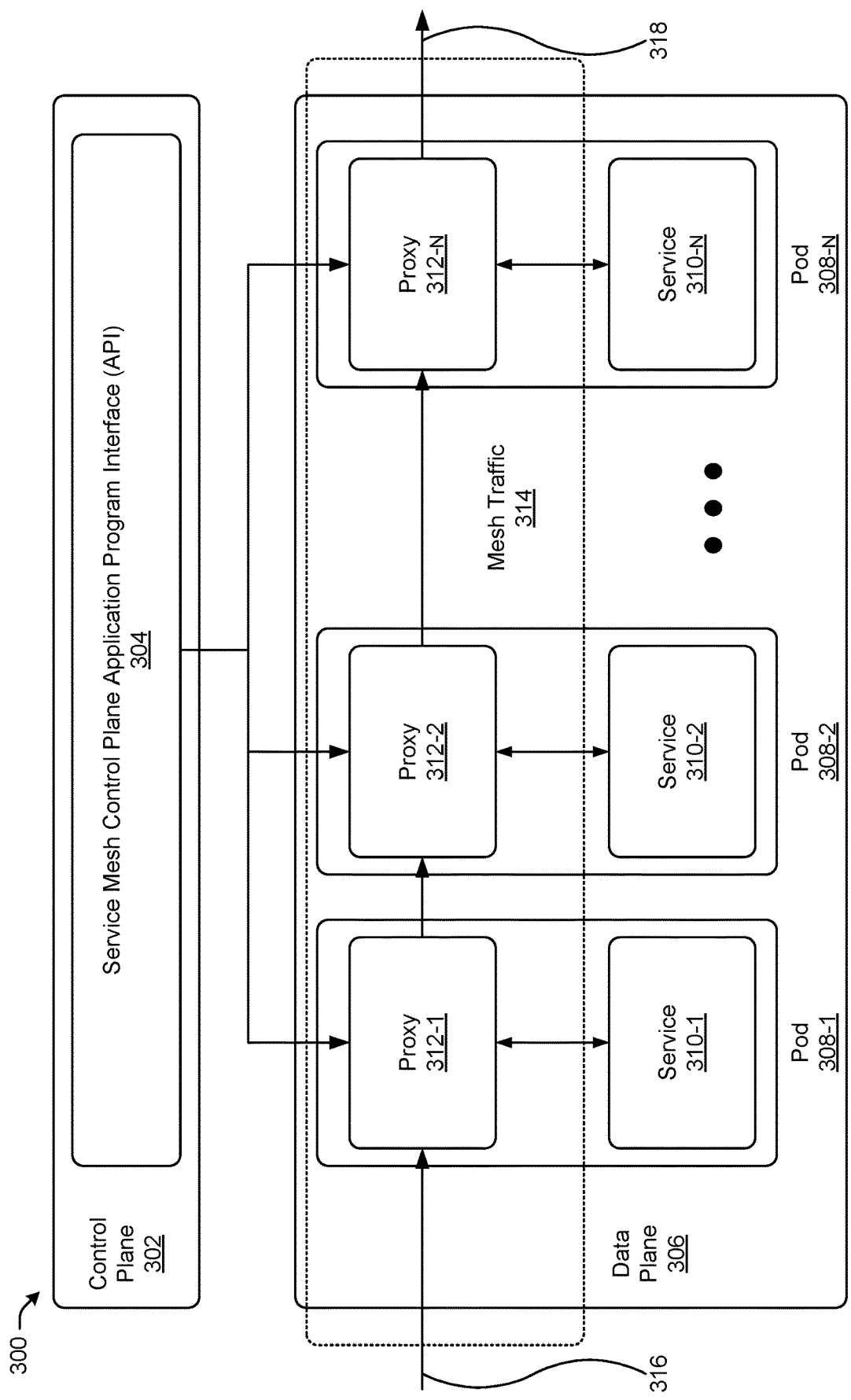
FIG. 3 illustrates a system-architecture diagram of a service mesh in which the systems of FIGS. 1 and 2 operate, according to an example of the principles described herein.

FIG. 3 illustrates a system-architecture diagram of a service mesh 300 in which the systems of FIGS. 1 and 2 operate, according to an example of the principles described herein. The service mesh 300 may include a control plane 302 and a data plane 306. The data plane 306 may include a set of intelligent proxies 312-1, 312-2 ... 312-N, where N is any integer greater than or equal to 1 (collectively referred to herein as proxy (ies) 312 unless specifically addressed otherwise) such as Envoy™ edge and service proxy. The control plane 302 may provide a reliable framework based on, for example, the Istio™ service mesh framework. The control plane 302 may be defined as a part of the service mesh 300 that is concerned with drawing the network topology and/or the information in a routing table that defines what to do with incoming data packets at the first NIC 108-1 and the second NIC 108-2 of FIGS. 1 and 2. Control plane functions, such as participating in routing protocols, may run in or by an architectural control element such as a service mesh control plane application program interface (API) 304. In one example, the routing table contains a list of destination addresses (e.g., addresses of the source computing device (not shown) and the requesting computing device (not shown)) and the outgoing interface(s) (e.g., the first NIC 108-1 and the second NIC 108-2 of FIGS. 1 and 2) associated with each. The control plane 302 may include logic that may identify certain packets to be discarded, as well as preferential treatment of certain packets for which a high quality of service is defined by such mechanisms as differentiated services.

The data plane 306 may allow for mesh traffic 314 to flow between the proxies 312 of a number of pods 308-1, 308-2 ... 308-N, where N is any integer greater than or equal to 1 (collectively referred to herein as pod(s) 308 unless specifically addressed otherwise). The mesh traffic 314 may include ingress traffic 316 and egress traffic 318. Each pod 308 may also include a number of services 310-1, 310-2, ... 310-N, where N is any integer greater than or equal to 1 (collectively referred to herein as service(s) 310 unless specifically addressed otherwise). The systems and methods described herein apply to the mesh traffic 314 between proxies 312 within the data plane 306. In one example, the mesh traffic may utilize HTTP/3 data transmission protocols. In transmitting data packets between the proxies 312, the first NIC 108-1 and the second NIC 108-2 may serve as the interfaces for the proxies 312 and the first control message 112-1 and the second control message 112-2 generated by the CPU may bring about the division of the control plane 302 and the data plane 306 as described herein.

Figure 4:
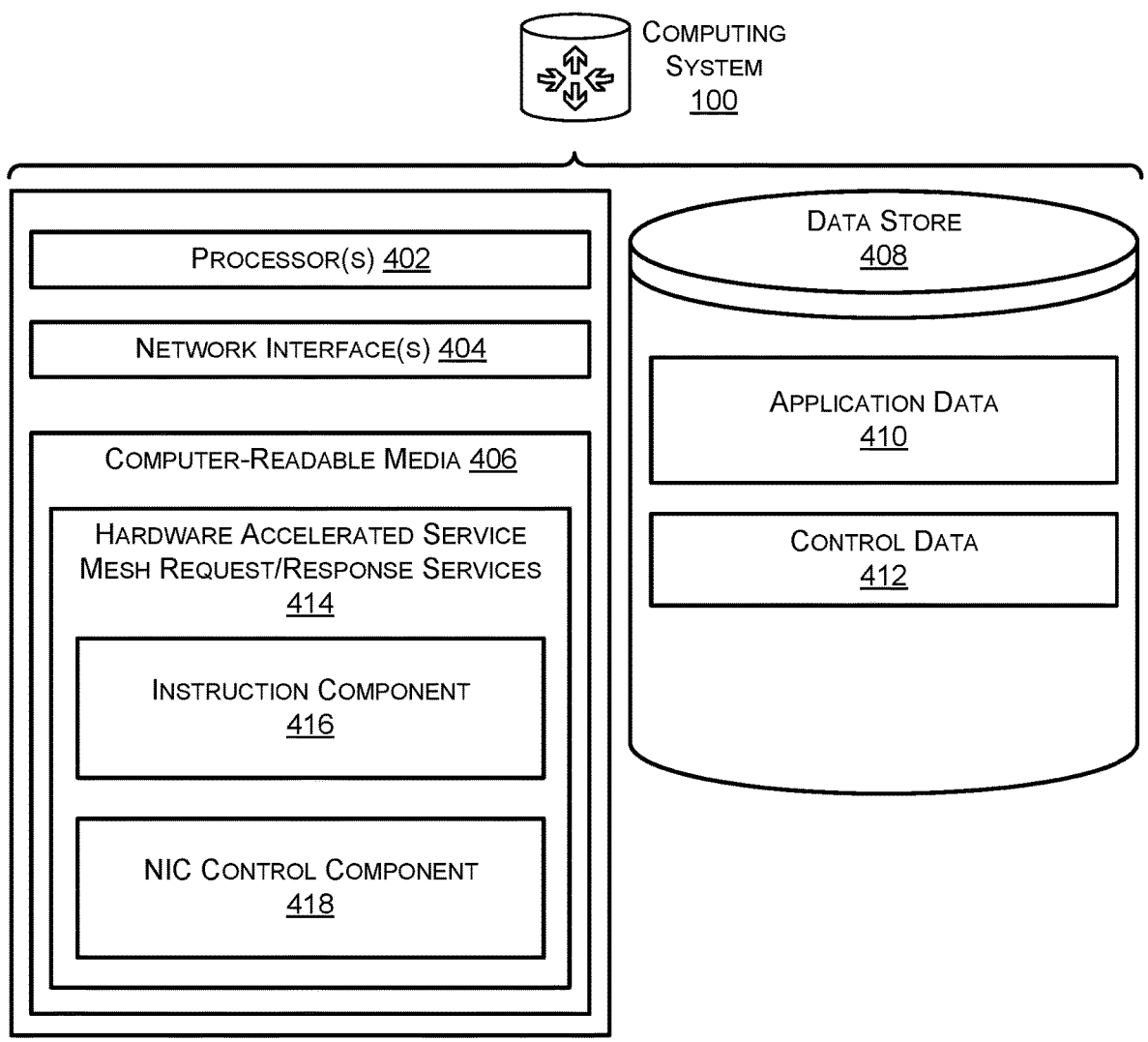
FIG. 4 is a component diagram of example components of the computing system of FIGS. 1 and 2 including hardware accelerated service mesh request/response services, according to an example of the principles described herein.

FIG. 4 is a component diagram of example components of the computing system 100 of FIGS. 1 and 2 including hardware accelerated service mesh request/response services 414, according to an example of the principles described herein. The computing system 100 may be embodied as a single computing device or may be embodied as a number of computing devices that interact together to bring about the functions described herein. As illustrated, the computing system 100 may include one or more hardware processor(s) 402 configured to execute one or more stored instructions. The processor(s) 402 may comprise one or more cores. In one example, the processor(s) 402 may be embodied as the CPU 102 of FIGS. 1 and 2. Further, the computing system 100 may include one or more network interfaces 404 configured to provide communications between the computing system 100 and other devices, such as devices associated with the system architecture of FIGS. 1 and 2 including the source computing device (not shown), the requesting computing device (not shown), and other devices communicatively coupled to the first NIC 108-1 and the second NIC 108-2, any computing device within the service mesh 300 of FIG. 3, and/or other systems or devices associated with the computing system 100 and/or remote from the computing system 100. In one example, the first NIC 108-1 and the second NIC 108-2 may serve as or as part of the network interfaces 404. The network interfaces 404 may include devices configured to couple to personal area networks (PANs), wired and wireless local area networks (LANs), wired and wireless wide area networks (WANs), and so forth. For example, the network interfaces 404 may include devices compatible with the source computing device (not shown), the requesting computing device (not shown), and other devices communicatively coupled to the first NIC 108-1 and the second NIC 108-2, any computing device within the service mesh 300 of FIG. 3 and/or other systems or devices associated with the computing system 100.

The computing system 100 may also include computer-readable media 406 that stores various executable components (e.g., software-based components, firmware-based components, etc.). In one example, the computer-readable media 406 may include, for example, working memory, random access memory (RAM), read only memory (ROM), and other forms of persistent, non-persistent, volatile, non-volatile, and other types of data storage. In addition to various components discussed herein, the computer-readable media 406 may further store components to implement functionality described herein. While not illustrated, the computer-readable media 406 may store one or more operating systems utilized to control the operation of the one or more devices that comprise the computing system 100. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the computing system 100 may include a data store 408 which may comprise one, or multiple, repositories or other storage locations for persistently storing and managing collections of data such as databases, simple files, binary, and/or any other data. The data store 408 may include one or more storage locations that may be managed by one or more database management systems. The data store 408 may store, for example, application data 410 defining computer-executable code utilized by the processor 402 to execute the hardware accelerated service mesh request/response services 414.

Further, the data store 408 may store control data 412. The control data 412 may include any data the CPU 102 may use to provide instructions to the first NIC 108-1 and the second NIC 108-2 to stream the data between the source computing device (not shown) and the requesting computing device (not shown). Further, the control data 412 may include any data used by the CPU 102 to generate the first control message 112-1 and the second control message 112-2.

The computer-readable media 406 may store portions, or components, of the hardware accelerated service mesh request/response services 414. The hardware accelerated service mesh request/response services 414 of the computer-readable media 406 may include an instruction component 416 to, when executed by the processor(s) 402, generate instructions as to how data packets may be transmitted from the first NIC 108-1 and the second NIC 108-2 and between the source computing device (not shown) and the requesting computing device (not shown) as described herein. Further, the instruction component 416 may, when executed by the processor(s) 402, generate the first control message 112-1 and the second control message 112-2 embodying the instructions provided by the CPU 102.

The hardware accelerated service mesh request/response services 414 of the computer-readable media 406 may further include a NIC control component 418 to, when executed by the processor(s) 402, allow for the control of the first NIC 108-1 and the second NIC 108-2 based on the instructions generated by the instruction component 416. Further, the NIC control component 418 may allow the first NIC 108-1 and the second NIC 108-2 to act to segregate the control plane 302 and the data plane 306 by transmitting data packets based on the first control message 112-1 and the second control message 112-2.

Figure 5:
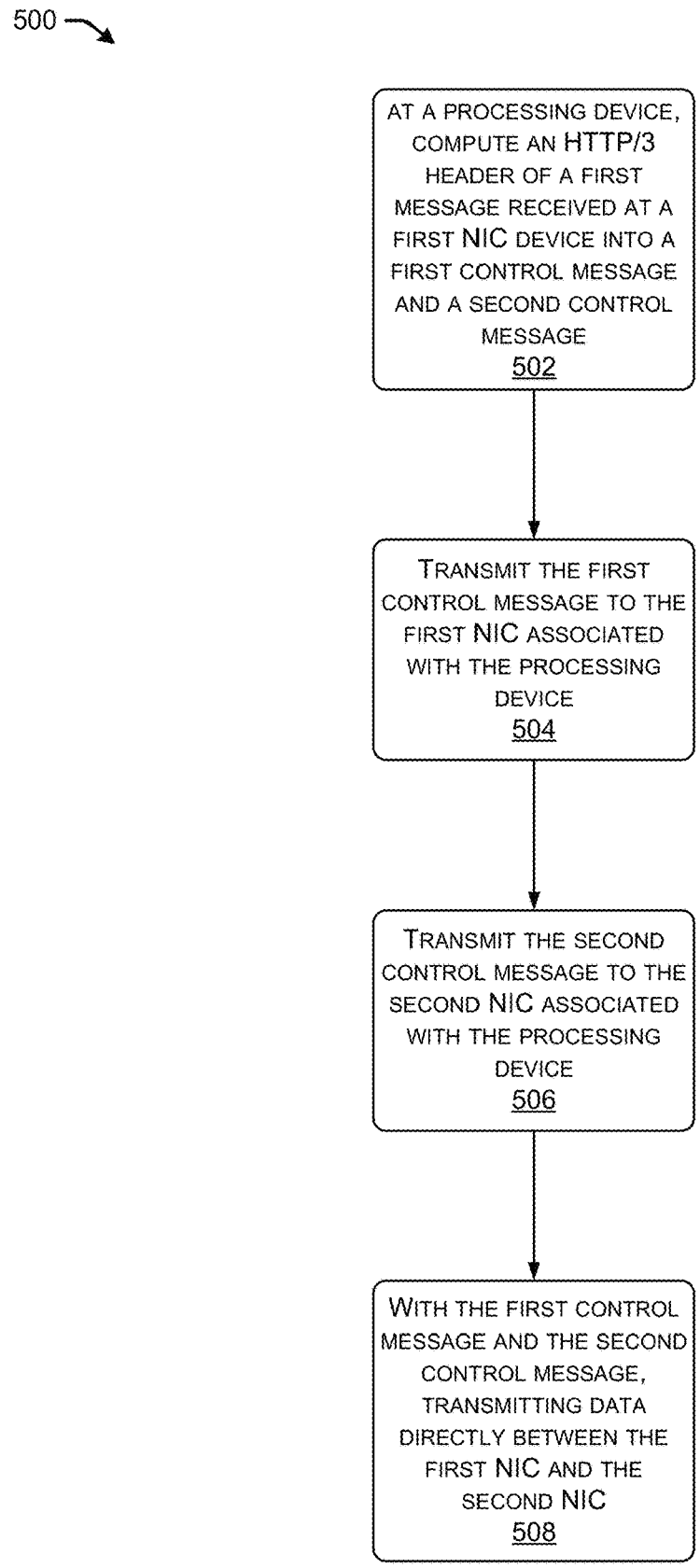
FIG. 5 illustrates a flow diagram of an example method of performing a hardware accelerated service mesh operation, according to an example of the principles described herein.

FIG. 5 illustrates a flow diagram of an example method 500 of performing a hardware accelerated service mesh operation, according to an example of the principles described herein. The method 500 of FIG. 5 may include, at a processing device such as the CPU 102, computing a hypertext transmission protocol version 3 (HTTP/3) header of a first message received at a first network interface controller (NIC) 108 into a first control message 112-1 and a second control message 112-2 at 502. At 504, the CPU 102 may transmit the first control message 112-1 to the first NIC 108-1 associated with the CPU 102. Similarly, at 506, the CPU 102 may transmit the second control message 112-2 to a second NIC 108-2 associated with the CPU 102. At 508, data may be transmitted directly between the first NIC 108-1 and the second NIC 108-2 based on instructions provided by the first control message 112-1 and the second control message 112-2. Details regarding the method 500 of FIG. 5 is provided below in connection with FIGS. 6 and 7.

Figure 6:
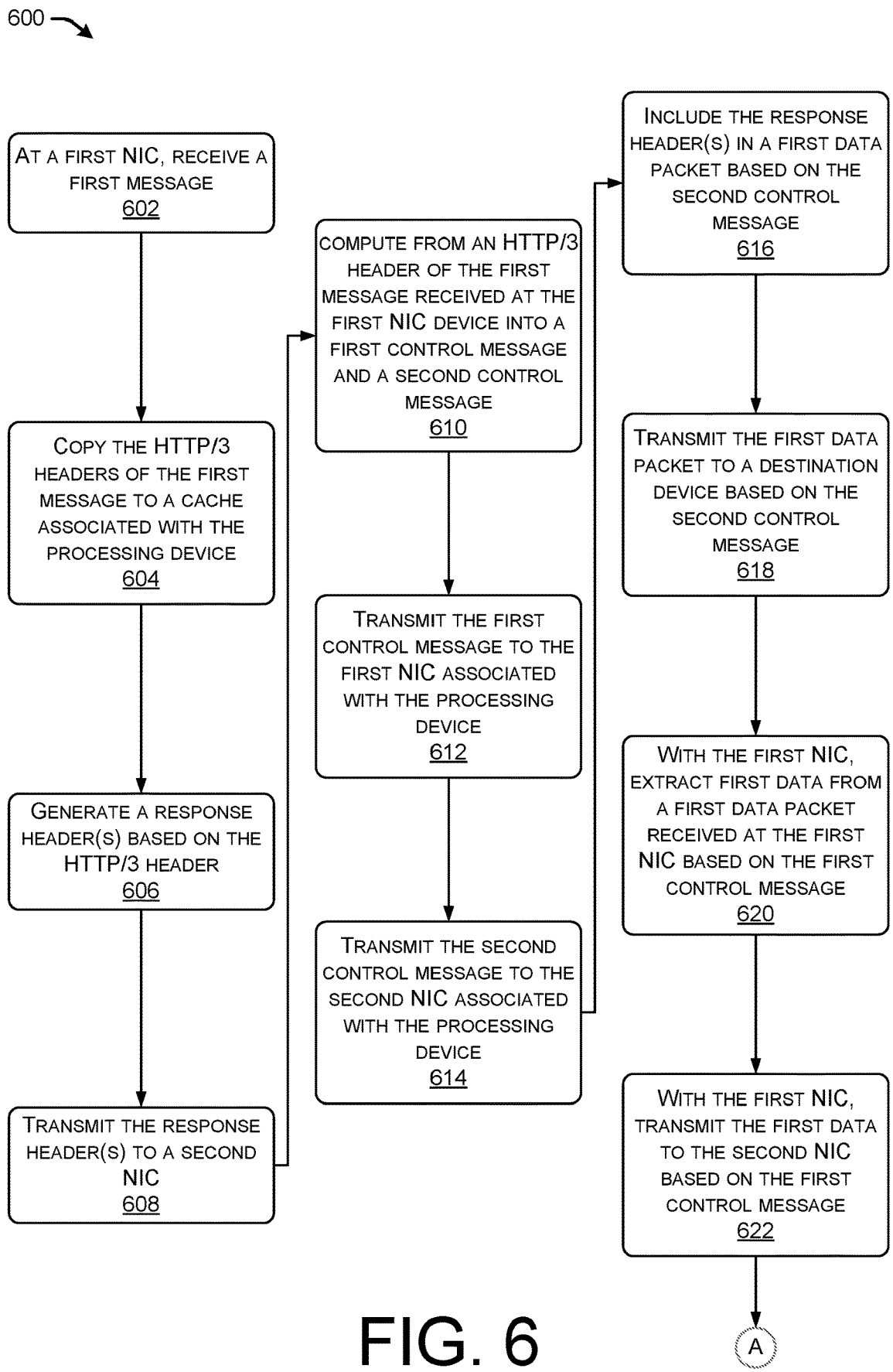
FIGS. 6 and 7 illustrate a flow diagram of an example method of performing a hardware accelerated service mesh operation, according to an example of the principles described herein.
Figure 7:
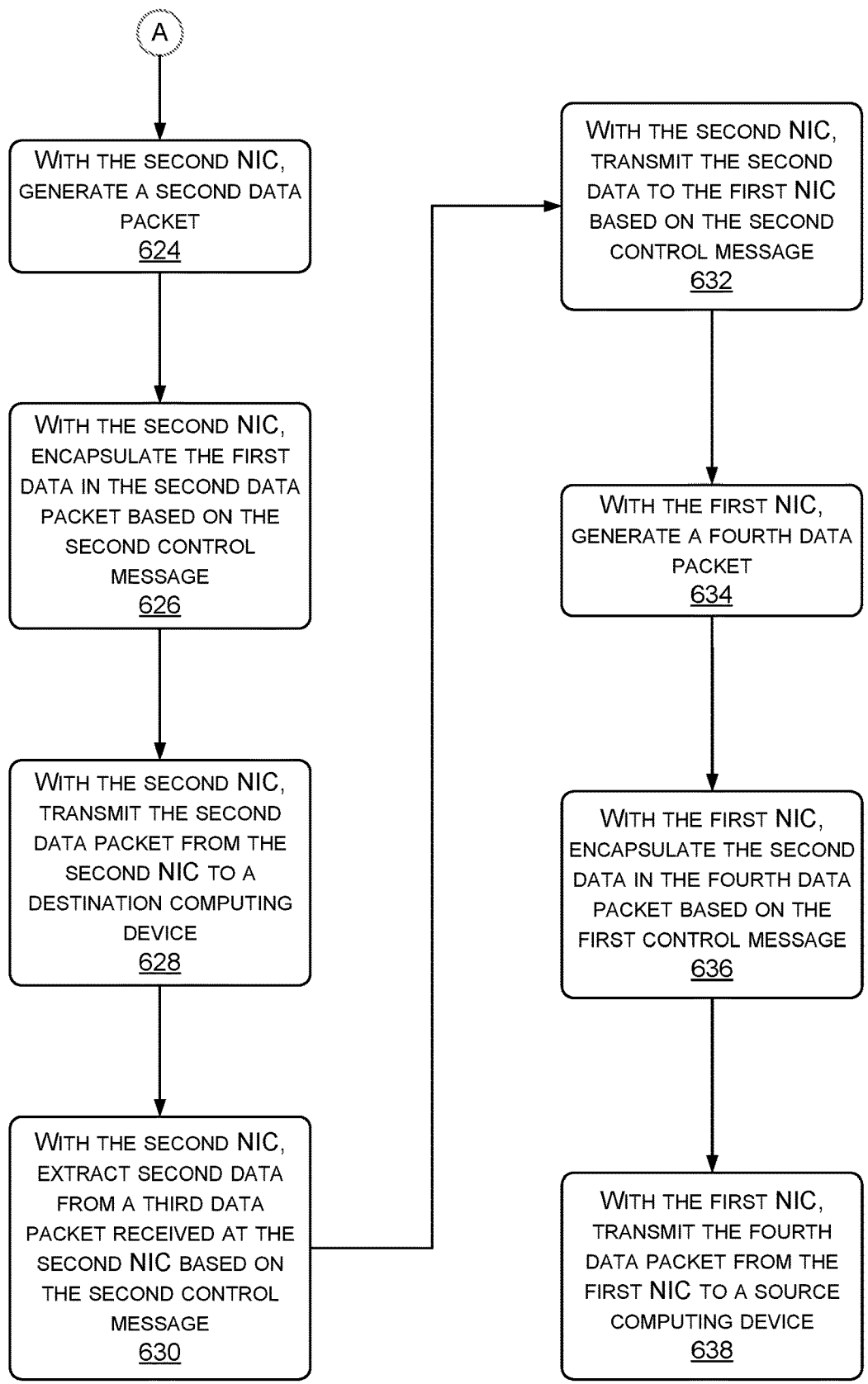

FIGS. 6 and 7 illustrate a flow diagram of an example method 600 of performing a hardware accelerated service mesh operation, according to an example of the principles described herein. The method 600 of FIG. 6 may include, at 602, receiving a first message (e.g., the direct request message 110 of FIG. 1) at the first NIC 108-1. At 604, the first NIC 108-1 and/or the CPU 102 may copy the HTTP/3 headers of the first message to the cache 104 associated with the CPU 102. At 606, the CPU 102 may generate response header(s) based on the HTTP/3 headers copied to the cache 104 at 604. The response header(s) may be transmitted to the second NIC 108-2 at 608.

At 610, the CPU 102 may compute the first control message 112-1 and the second control message 112-2 from the HTTP/3 header(s) of the first message received at the first NIC 108-1. In one example, the HTTP/3 header(s) include information regarding what data is to be transmitted via the computing system 100, and, therefore, the CPU 102 may identify this data and compute the first control message 112-1 and the second control message 112-2 to allow for that data to be transmitted.

The CPU 102 may transmit the first control message 112-1 to the first NIC 108-1 and the second NIC 108-2, respectively, at 612. Similarly, at 614, the CPU 102 may transmit the second control message 112-2 to the second NIC 108-2.

At 616, the response header(s) generated at 606 and transmitted to the second NIC 108-2 at 608 may be placed in a first data packet such as the response packet 114 of FIG. 1 generated by the second NIC 108-2. The generation of the response packet 114 may be performed by the second NIC 108-2 based on instructions provided by the second control message 112-2. The second NIC 108-2, at 618, may transmit the first data packet (e.g., the response packet 114 of FIG. 1) to a destination device communicatively coupled to the second NIC 108-2 such as the requesting computing device (not shown) of FIGS. 1 and 2. The first data packet (e.g., the response packet 114 of FIG. 1) may be transmitted at 618 based on the second control message 112-2 and the instructions from the CPU 102 contained therein.

At 620, the first NIC 108-1 may extract first data from a first data packet (e.g., the QUIC/HTTP data packet transmission message 116) received at the first NIC 108-1 based on the instructions provided by the first control message 112-1. In one example, the first control message 112-1 may include instructions to allow for data transmitted via the first data packet (e.g., the QUIC/HTTP data packet transmission message 116) to be streamed to the second NIC 108-2 and on to the requesting computing device (not shown).

The first NIC 108-1, based on the first control message 112-1, may transmit the first data received from the first data packet (e.g., the QUIC/HTTP data packet transmission message 116) at 622. This is performed by receiving the payload message 116 at the first NIC 108-1 including the data payload or payload packet(s) for transmission to the second NIC 108-2 and ultimately the requesting computing device (not shown). The first NIC 108-1 may unload or de-encapsulate the payload received at the first NIC 108-1 within payload message 116 to obtain the data packets from the payload message 116. As mentioned herein, the payload may include a number of data blocks (e.g., a number of separate 1K data segments). Further, the first NIC 108-1 may unload or de-encapsulate the payload based on instructions from the first control message 112-1.

At 624, the second NIC 108-2 may generate a second data packet (e.g., a QUIC/HTTP data packet transmission message 118). More specifically, the second control message 112-2 may instruct the second NIC 108-2 to generate the QUIC/HTTP data packet transmission message 118 for transmitting the data packets obtained via the payload message 116 at the first NIC 108-1. The second NIC 108-2 may encapsulate the first data in the second data packet (e.g., the QUIC/HTTP data packet transmission message 118) based on the second control message at 626. State another way the second control message 112-2 may instruct the second NIC 108-2 to load or encapsulate the data packets into the QUIC/HTTP data packet transmission message 118.

At 628, the second NIC 108-2 may transmit the second data packet (e.g., the QUIC/HTTP data packet transmission message 118) from the second NIC 108-2 to a destination computing device. Here, the second control message 112-2 may instruct the second NIC 108-2 to transmit the QUIC/HTTP data packet transmission message 118 including the data packets to the requesting computing device (not shown) communicatively coupled to the second NIC 108-2. The requesting computing device (not shown) is the destination to which the data packets are to be sent as defined by the direct request message 110, the CPU 102, and the first control message 112-1 and second control message 112-2.

In order to provide hardware accelerated service mesh responses as well as the hardware accelerated service mesh requests described above, at 630, the second NIC 108-2 may extract second data from a third data packet (e.g., payload message 206). The payload message 206 may include a number of payload packets that include a number of separate 1K data segments for transmission to the source computing device (not shown) via the PCIe switch 106 and the first NIC 108-1. The second NIC 108-2 may, at 630, unload or de-encapsulate the payload (e.g., the 1K data blocks) from the payload packets of the third data packet (e.g., payload message 206) based on the second control message 112-2. Again, the first control message 112-1 and the second control message 112-2 may be retained within the first NIC 108-1 and the second NIC 108-2, respectively, in order to allow for the instructions provided by the CPU 102 to be realized throughout data streaming in both directions between the source computing device (not shown) and the requesting computing device (not shown).

At 632, the second NIC 108-2 may transmit the second data (e.g., the 1K data blocks) to the first NIC 108-1 via the PCIe switch 106 based on the second control message 112-2. Again, the unloaded or de-encapsulated payload (e.g., the 1K data blocks) is directly transmitted to the first NIC 108-1 without moving through the cache 104 of the CPU 102.

The first NIC 108-1 may generate a fourth data packet at 634. More specifically, the first NIC 108-1 may generate a QUIC/HTTP data packet transmission message 208 based on instructions received from the first control message 112-1 for transmitting the data packets received at the first NIC 108-1 to the source computing device (not shown). The QUIC/HTTP data packet transmission message 116 may include a number of payload packets to carry the payload (e.g., the 1K data blocks). Thus, at 636, the first NIC 108-1, based on instructions from the first control message 112-1, may load or encapsulate the payload (e.g., the 1K data blocks) into the QUIC/HTTP data packet transmission message 208. And at 638, the first NIC 108-1 may be instructed by the first control message 112-1 to transmit the fourth data package (e.g., the QUIC/HTTP data packet transmission message 208) from the first NIC 108-1 to the source computing device (not shown).

Figure 8:
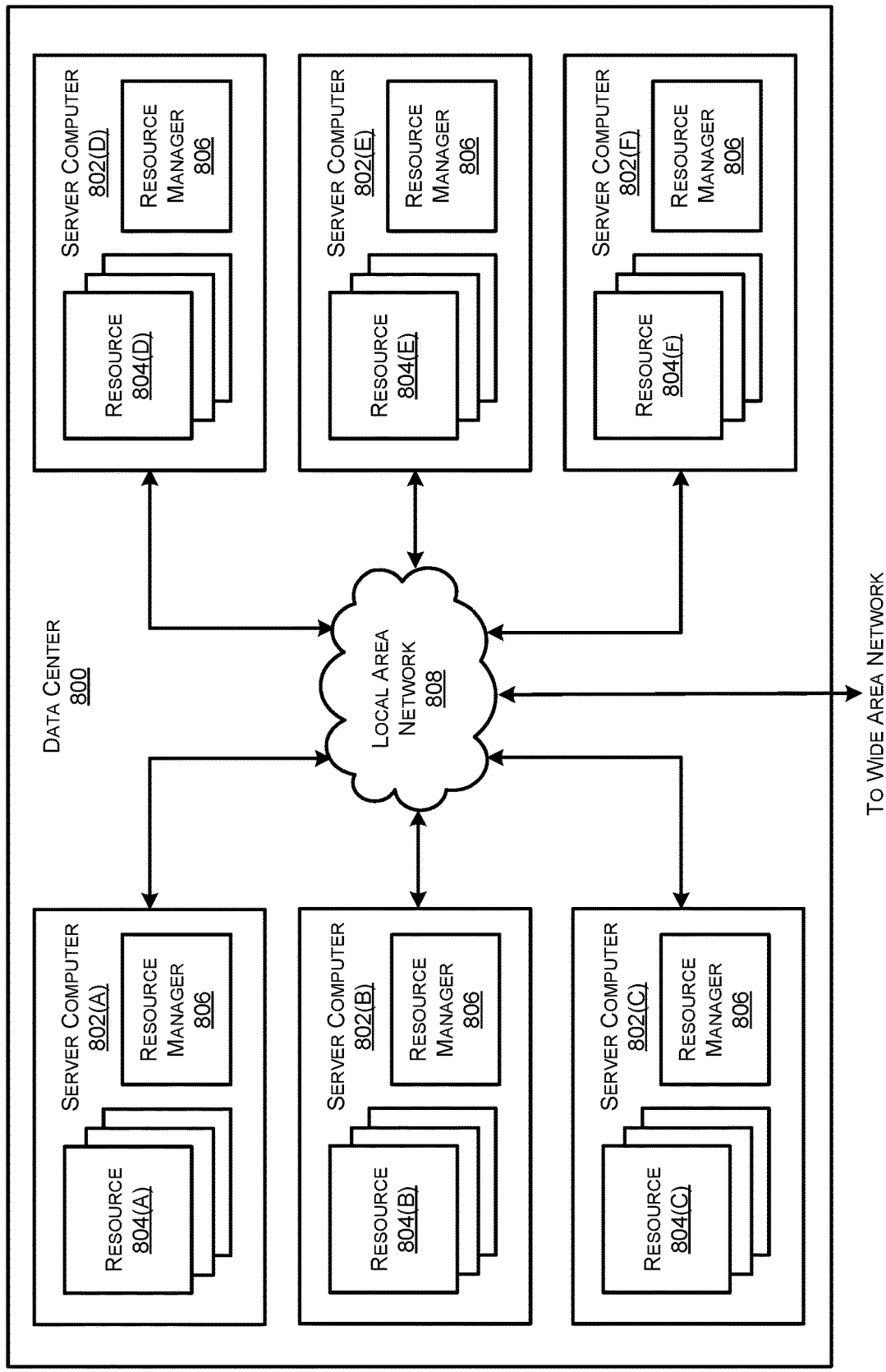
FIG. 8 illustrates a computing system diagram illustrating a configuration for a data center that may be utilized to implement aspects of the technologies disclosed herein.

FIG. 8 illustrates a computing system diagram illustrating a configuration for a data center 800 that may be utilized to implement aspects of the technologies disclosed herein. The example data center 800 shown in FIG. 8 includes several server computers 802A-802F (which might be referred to herein singularly as "a server computer 802" or in the plural as "the server computers 802) for providing computing resources. In some examples, the resources and/or server computers 802 may include, or correspond to, any type of networked device described herein. Although described as servers, the server computers 802 may comprise any type of networked device, such as servers, switches, routers, hubs, bridges, gateways, modems, repeaters, access points, etc.

The server computers 802 may be standard tower, rack-mount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, virtual private networks (VPNs), and others. Some of the server computers 802 may also be configured to execute a resource manager 806 capable of instantiating and/or managing the computing resources. In the case of VM instances, for example, the resource manager 806 may be a hypervisor or another type of program configured to enable the execution of multiple VM instances on a single server computer 802. Server computers 802 in the data center 800 may also be configured to provide network services and other types of services.

In the example data center 800 shown in FIG. 8, an appropriate LAN 808 is also utilized to interconnect the server computers 802A-802F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 800, between each of the server computers 802A-802F in each data center 800, and, potentially, between computing resources in each of the server computers 802. It may be appreciated that the configuration of the data center 800 described with reference to FIG. 8 is merely illustrative and that other implementations may be utilized.

In some examples, the server computers 802 and or the computing resources 804 may each execute/host one or more tenant containers and/or virtual machines to perform techniques described herein.

In some instances, the data center 800 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 804 provided by the cloud computing network may include various types of computing resources, such as data processing resources like tenant containers and VM instances, data storage resources, networking resources, data communication resources, network services, VPN instances, and the like.

Each type of computing resource 804 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 804 not mentioned specifically herein.

The computing resources 804 provided by a cloud computing network may be enabled in one example by one or more data centers 800 (which might be referred to herein singularly as "a data center 800" or in the plural as "the data centers 800). The data centers 800 are facilities utilized to house and operate computer systems and associated components. The data centers 800 typically include redundant and backup power, communications, cooling, and security systems. The data centers 800 may also be located in geographically disparate locations. One illustrative example for a data center 800 that may be utilized to implement the technologies disclosed herein is described herein with regard to, for example, FIGS. 1 through 7.

Figure 9:
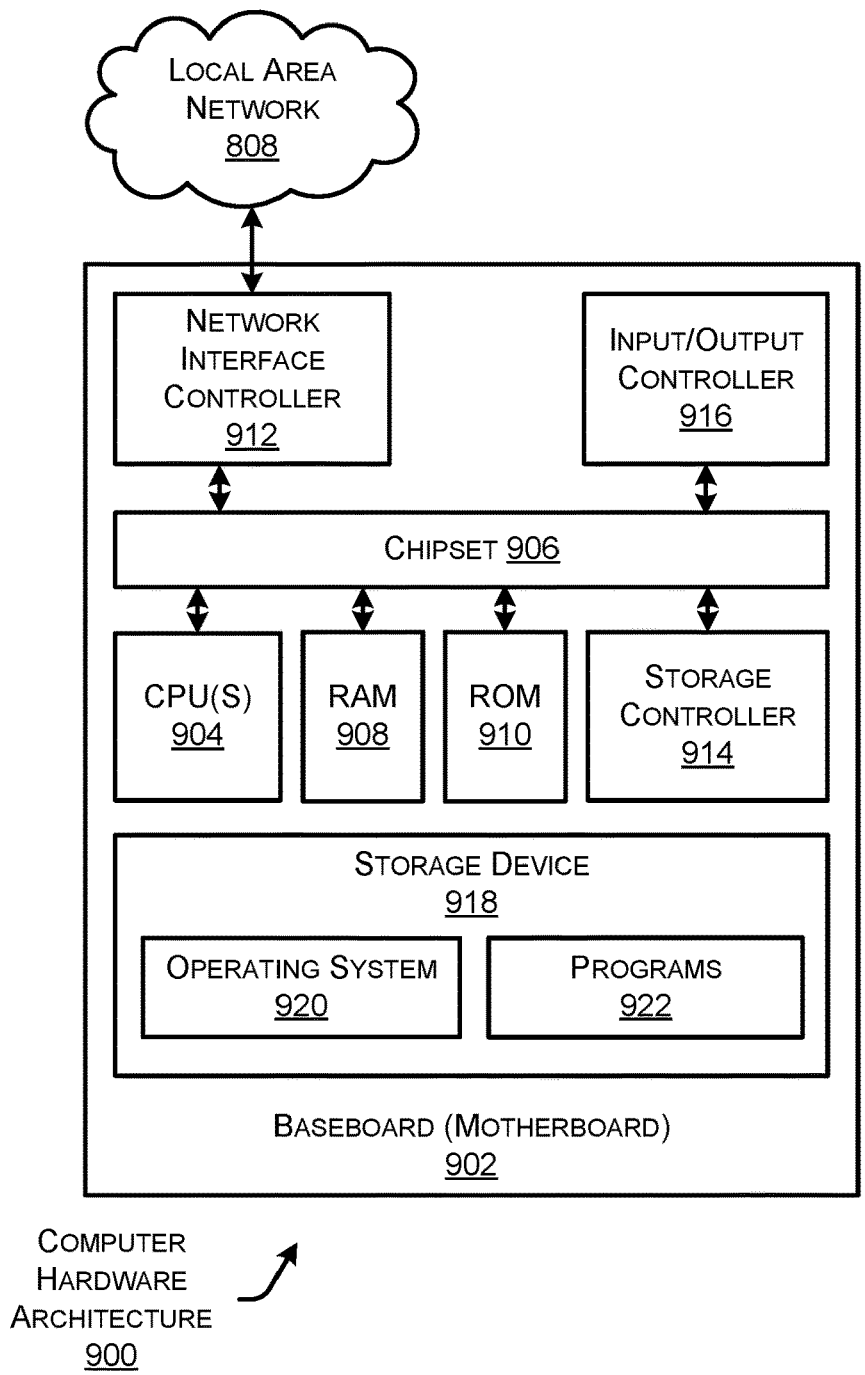
FIG. 9 illustrates a computer architecture diagram showing an example computer hardware architecture for implementing a computing device that may be utilized to implement aspects of the various technologies presented herein.

FIG. 9 illustrates a computer architecture diagram showing an example computer hardware architecture 900 for implementing a computing device that may be utilized to implement aspects of the various technologies presented herein. The computer hardware architecture 900 shown in FIG. 9 illustrates the CPU 102, the cache 104, the first NIC 108-1, the second NIC 108-2, the source computing device (not shown), the requesting computing device (not shown), other devices communicatively coupled to the first NIC 108-1 and/or the second NIC 108-2, any computing device within the service mesh 300 of FIG. 3, and/or other systems or devices associated with the computing system 100 and/or remote from the computing system 100, a workstation, a desktop computer, a laptop, a tablet, a network appliance, an e-reader, a smartphone, or other computing device, and may be utilized to execute any of the software components described herein. The computer 900 may, in some examples, correspond to a network device (e.g., first NIC 108-1, the second NIC 108-2, the source computing device (not shown), the requesting computing device (not shown), and other devices communicatively coupled to the first NIC 108-1 and/or the second NIC 108-2, any computing device within the service mesh 300 of FIG. 3, and/or other systems or devices associated with the computing system 100 and/or remote from the computing system 100 (and associated devices) described herein, and may comprise networked devices such as servers, switches, routers, hubs, bridges, gateways, modems, repeaters, access points, etc.

The computer 900 includes a baseboard 902, or "motherboard," which is a printed circuit board to which a multitude of components or devices may be connected by way of a system bus or other electrical communication paths. In one illustrative configuration, one or more central processing units (CPUs) 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory (ROM) 910 or non-volatile RAM (NVRAM) for storing basic routines that help to startup the computer 900 and to transfer information between the various components and devices. The ROM 910 or NVRAM may also store other software components necessary for the operation of the computer 900 in accordance with the configurations described herein.

The computer 900 may operate in a networked environment using logical connections to remote computing devices and computer systems through a network, such as the CPU 102, the cache 104, the first NIC 108-1, the second NIC 108-2, the source computing device (not shown), the requesting computing device (not shown), other devices communicatively coupled to the first NIC 108-1 and/or the second NIC 108-2, any computing device within the service mesh 300 of FIG. 3, and/or other systems or devices associated with the computing system 100 and/or remote from the computing system 100, among other devices. The chipset 906 may include functionality for providing network connectivity through a Network Interface Controller (NIC) 912, such as a gigabit Ethernet adapter. The NIC 912 is capable of connecting the computer 900 to other computing devices within the computing system 100 and external to the computing system 100. It may be appreciated that multiple NICs 912 may be present in the computer 900, connecting the computer to other types of networks and remote computer systems. In some examples, the NIC 912 may be configured to perform at least some of the techniques described herein, such as packet redirects and/or other techniques described herein.

The computer 900 may be connected to a storage device 918 that provides non-volatile storage for the computer. The storage device 918 may store an operating system 920, programs 922 (e.g., any computer-readable and/or computer-executable code described herein), and data, which have been described in greater detail herein. The storage device 918 may be connected to the computer 900 through a storage controller 914 connected to the chipset 906. The storage device 918 may consist of one or more physical storage units. The storage controller 914 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 900 may store data on the storage device 918 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 918 is characterized as primary or secondary storage, and the like.

For example, the computer 900 may store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the storage device 918 by detecting the physical states or characteristics of one or more particular locations within the physical storage units.

In addition to the storage device 918 described above, the computer 900 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 900. In some examples, the operations performed by the CPU 102, the cache 104, the first NIC 108-1, the second NIC 108-2, the source computing device (not shown), the requesting computing device (not shown), other devices communicatively coupled to the first NIC 108-1 and/or the second NIC 108-2, any computing device within the service mesh 300 of FIG. 3, and/or other systems or devices associated with the computing system 100 and/or remote from the computing system 100, and or any components included therein, may be supported by one or more devices similar to computer 900. Stated otherwise, some or all of the operations performed by the CPU 102, the cache 104, the first NIC 108-1, the second NIC 108-2, the source computing device (not shown), the requesting computing device (not shown), other devices communicatively coupled to the first NIC 108-1 and/or the second NIC 108-2, any computing device within the service mesh 300 of FIG. 3, and/or other systems or devices associated with the computing system 100 and/or remote from the computing system 100, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 918 may store an operating system 920 utilized to control the operation of the computer 900. According to one example, the operating system 920 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 918 may store other system or application programs and data utilized by the computer 900.

In one example, the storage device 918 or other computer-readable storage media is encoded with computer-executable instructions which, when loaded into the computer 900, transform the computer from a general-purpose computing system into a special-purpose computer capable of implementing the examples described herein. These computer-executable instructions transform the computer 900 by specifying how the CPUs 904 transition between states, as described above. According to one example, the computer 900 has access to computer-readable storage media storing computer-executable instructions which, when executed by the computer 900, perform the various processes described above with regard to FIGS. 1 through 8. The computer 900 may also include computer-readable storage media having instructions stored thereupon for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, an input/output controller 916 may provide output to a display, such as a computer monitor, a flat-panel display, a digital projector, a printer, or other type of output device. It will be appreciated that the computer 900 might not include all of the components shown in FIG. 9, may include other components that are not explicitly shown in FIG. 9, or might utilize an architecture completely different than that shown in FIG. 9.

As described herein, the computer 900 may comprise one or more of the CPU 102, the cache 104, the first NIC 108-1, the second NIC 108-2, the source computing device (not shown), the requesting computing device (not shown), other devices communicatively coupled to the first NIC 108-1 and/or the second NIC 108-2, any computing device within the service mesh 300 of FIG. 3, and/or other systems or devices associated with the computing system 100 and/or remote from the computing system 100. The computer 900 may include one or more hardware processor(s) such as the CPUs 904 configured to execute one or more stored instructions. The CPUs 904 may comprise one or more cores. Further, the computer 900 may include one or more network interfaces configured to provide communications between the computer 900 and other devices, such as the communications described herein as being performed by the CPU 102, the cache 104, the first NIC 108-1, the second NIC 108-2, the source computing device (not shown), the requesting computing device (not shown), other devices communicatively coupled to the first NIC 108-1 and/or the second NIC 108-2, any computing device within the service mesh 300 of FIG. 3, and/or other systems or devices associated with the computing system 100 and/or remote from the computing system 100, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 922 may comprise any type of programs or processes to perform the techniques described in this disclosure for the CPU 102, the cache 104, the first NIC 108-1, the second NIC 108-2, the source computing device (not shown), the requesting computing device (not shown), other devices communicatively coupled to the first NIC 108-1 and/or the second NIC 108-2, any computing device within the service mesh 300 of FIG. 3, and/or other systems or devices associated with the computing system 100 and/or remote from the computing system 100 as described herein. The programs 922 may enable the devices described herein to perform various operations.

CONCLUSION

The examples described herein provide for the splitting of the control plane and the data plane to ensure that the data is not cached in a cache of a CPU during a data streaming process. This has significant advantages within the proxying of L7 HTTP messages. Structurally, in service mesh-based cloud applications, HTTP headers are control information which are passed by proxies. The proxies make complex decisions about the next hop of the HTTP messages and what, if any, operations may or should be performed on the HTTP headers. The service mesh proxies do not eliminate HTTP, TCP, or UDP headers from packets before routing those packets. The present systems and methods preserve the ability to remove the headers from the packets. Thus, the present systems and method leave decision making processes such as HTTP routing, etc. with the CPU where arbitrarily complex code may be used to make those decisions. However, once the decisions are made, the present systems and methods offload the data plane to a first and second network interface controller (NIC). The first and second NIC may handle the encapsulation and de-encapsulation, as well as the forwarding the relevant payloads directly between the first and second NIC over a PCIe switch without passing the data payload through a cache of the CPU.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A non-transitory computer-readable medium storing instructions that, when executed, causes a processor to perform operations, comprising:
at a processing device, computing a hypertext transmission protocol version 3 (HTTP/3) header of a first message received at a first network interface controller (NIC) of a source computing device within a mesh network into a first control message and a second control message;
transmitting the first control message to the first NIC, wherein the first control message defines a destination computing device to which a payload is to be sent;
transmitting the second control message to a second NIC of a requesting computing device within the mesh network and communicatively coupled to the processing device, wherein the second control message defines instructions to the destination computing device to expect the payload; and
with the first control message and the second control message, transmitting data directly between the first NIC and the second NIC.

2. The non-transitory computer-readable medium of claim 1, the operations further comprising:
copying the HTTP/3 header of the first message to a cache associated with the processing device;
generating a response header based on the HTTP/3 header;
transmitting the response header to the second NIC;
including the response header in a first data packet based on the second control message; and
transmitting the first data packet to a destination device based on the second control message.

3. The non-transitory computer-readable medium of claim 1, the operations further comprising:
with the first NIC:
extracting first data from a first data packet received at the first NIC based on the first control message; and
transmitting the first data to the second NIC based on the first control message.

4. The non-transitory computer-readable medium of claim 3, the operations further comprising:
with the second NIC:
generating a second data packet;
encapsulating the first data in the second data packet based on the second control message; and
transmitting the second data packet from the second NIC to a destination computing device.

5. The non-transitory computer-readable medium of claim 4, the operations further comprising:
with the second NIC:
extracting second data from a third data packet received at the second NIC based on the second control message; and
transmitting the second data to the first NIC based on the second control message.

6. The non-transitory computer-readable medium of claim 5, the operations further comprising:
with the first NIC:
generating a fourth data packet;
encapsulating the second data in the fourth data packet based on the first control message; and
transmitting the fourth data packet from the first NIC to a source computing device.

7. A method of managing data streaming processes, comprising:
at a processing device, computing hypertext transmission protocol version 3 (HTTP/3) header of a first message received at a first network interface controller (NIC) of a source computing device within a mesh network into a first control message and a second control message;
transmitting the first control message to the first NIC, wherein the first control message defines a destination computing device to which a payload is to be sent;
transmitting the second control message to a second NIC of a requesting computing device within the mesh network and communicatively coupled to the processing device, wherein the second control message defines instructions to the destination computing device to expect the payload; and
with the first control message and the second control message, transmitting data directly between the first NIC and the second NIC.

8. The method of claim 7, further comprising:
copying the HTTP/3 header of the first message to a cache associated with the processing device;
generating a response header based on the HTTP/3 header;
transmitting the response header to the second NIC;
including the response header in a first data packet based on the second control message; and
transmitting the first data packet to a destination device based on the second control message.

9. The method of claim 7, further comprising:
with the first NIC:
extracting first data from a first data packet received at the first NIC based on the first control message; and
transmitting the first data to the second NIC based on the first control message.

10. The method of claim 9, further comprising:
with the second NIC:
generating a second data packet;
encapsulating the first data in the second data packet based on the second control message; and
transmitting the second data packet from the second NIC to a destination computing device.

11. The method of claim 10, further comprising:
with the second NIC:
extracting second data from a third data packet received at the second NIC based on the second control message; and
transmitting the second data to the first NIC based on the second control message.

12. The method of claim 11, further comprising:
with the first NIC:
generating a fourth data packet;
encapsulating the second data in the fourth data packet based on the first control message; and
transmitting the fourth data packet from the first NIC to a source computing device.

13. A system comprising:
a processor; and
a non-transitory computer-readable media storing instructions that, when executed by the processor, causes the processor to perform operations comprising:
  at the processor, computing a hypertext transmission protocol version 3 (HTTP/3) header of a first message received at a first network interface controller (NIC) of a source computing device within a mesh network into a first control message and a second control message;
  transmitting the first control message to the first NIC, wherein the first control message defines a destination computing device to which a payload is to be sent;
  transmitting the second control message to a second NIC of a requesting computing device within the mesh network and communicatively coupled to the processor, wherein the second control message defines instructions to the destination computing device to expect the payload; and
  with the first control message and the second control message, transmitting data directly between the first NIC and the second NIC.

14. The system of claim 13, the operations further comprising:
  copying the HTTP/3 header of the first message to a cache associated with the processor;
  generating a response header based on the HTTP/3 header;
  transmitting the response header to the second NIC;
  including the response header in a first data packet based on the second control message; and
  transmitting the first data packet to a destination device based on the second control message.

15. The system of claim 13, the operations further comprising:
  with the first NIC:
    extracting first data from a first data packet received at the first NIC based on the first control message; and
    transmitting the first data to the second NIC based on the first control message.

16. The system of claim 15, the operations further comprising:
  with the second NIC:
    generating a second data packet;
    encapsulating the first data in the second data packet based on the second control message; and
    transmitting the second data packet from the second NIC to a destination computing device.

17. The system of claim 16, the operations further comprising:
  with the second NIC:
    extracting second data from a third data packet received at the second NIC based on the second control message; and
    transmitting the second data to the first NIC based on the second control message.

18. The system of claim 17, the operation further comprising:
  with the first NIC:
    generating a fourth data packet;
    encapsulating the second data in the fourth data packet based on the first control message; and
    transmitting the fourth data packet from the first NIC to a source computing device.

* * * * *